(12) United States Patent
Koob (10) Patent No.: US 11,361,256 B2
(45) Date of Patent: *Jun. 14, 2022

(54) METHOD FOR MAPPING CROP YIELDS

(71) Applicant: BASF AGRO TRADEMARKS GMBH, Ludwigshafen am Rein (DE)

(72) Inventor: James Koob, Whippany, NJ (US)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 15 days.

This patent is subject to a terminal disclaimer.

(21) Appl. No.: 16/933,411

(22) Filed: Jul. 20, 2020

(65) Prior Publication Data

US 2020/0364629 A1 Nov. 19, 2020

Related U.S. Application Data

(63) Continuation of application No. 16/345,778, filed as application No. PCT/US2017/059146 on Oct. 31, 2017, now Pat. No. 10,719,787.

(60) Provisional application No. 62/414,928, filed on Oct. 31, 2016.

(51) Int. Cl.
*G06Q 10/04* (2012.01)
*G06Q 50/02* (2012.01)
*G06V 20/10* (2022.01)

(52) U.S. Cl.
CPC ............. *G06Q 10/04* (2013.01); *G06Q 50/02* (2013.01); *G06V 20/188* (2022.01)

(58) Field of Classification Search
USPC .................................................. 382/100, 110
See application file for complete search history.

(56) References Cited

U.S. PATENT DOCUMENTS

| | | | |
|---|---|---|---|
| 8,135,178 B2 | 3/2012 | Hendrickson et al. | |
| 10,096,073 B2* | 10/2018 | Groeneveld | G06Q 10/06315 |
| 10,719,787 B2* | 7/2020 | Koob | G06Q 10/04 |
| 2008/0304711 A1 | 12/2008 | Scharf et al. | |
| 2015/0116330 A1 | 4/2015 | Chiocco et al. | |
| 2015/0206255 A1 | 7/2015 | Groenerveld | |
| 2016/0073573 A1 | 3/2016 | Ethington et al. | |
| 2016/0180473 A1 | 6/2016 | Groenerveld | |
| 2018/0181893 A1* | 6/2018 | Basso | G06Q 50/02 |
| 2019/0059203 A1 | 2/2019 | Staples et al. | |
| 2019/0335674 A1 | 11/2019 | Basso | |

OTHER PUBLICATIONS

International Search Report for PCT/US2017/059146 dated Jan. 19, 2018.
Written Opinion of the International Searching Authority for PCT/US2017/059146 dated Jan. 19, 2018.

* cited by examiner

*Primary Examiner* — Ishrat I Sherali
(74) *Attorney, Agent, or Firm* — Lowenstein Sandler LLP (57) ABSTRACT

Systems and methods for generating crop yield maps are provided. In one example embodiment, a method comprises accessing data indicative of crop yield for a field area; accessing one or more data types associated with the field area, each of the data types providing a geospatial distribution of data associated with vegetation across the field area; determining a crop yield distribution for the field area; and generating a yield map for the field area based at least partially on the crop yield distribution.

20 Claims, 5 Drawing Sheets

METHOD FOR MAPPING CROP YIELDS

CROSS-REFERENCE TO RELATED APPLICATION(S)

This application is a continuation of U.S. patent application Ser. No. 16/345,778, filed on Apr. 29, 2019, which is a national stage entry under 35 U.S.C. § 371 of International Application Serial No. PCT/US2017/059146, filed on Oct. 31, 2017, which claims the benefit of priority of U.S. Provisional Application Ser. No. 62/414,928, filed on Oct. 31, 2016, the disclosures of which are hereby incorporated by reference herein in their entireties.

FIELD

The present disclosure relates generally to crop yield mapping.

BACKGROUND

Crop mapping can be used to analyze variables such as crop yield in a field. More particularly, a yield map can be used to assess a distribution of crop yield across a field or other space. Yield maps can be used, for instance, to analyze the variability of crop yield at particular locations in response to various inputs (e.g., moisture content, use of fungicide, stand count, etc.). A link between crop yield and a specific geographic point in a field or other space can be important in the accuracy of such analysis.

Harvest equipment, such as a harvester, can include systems used to generate yield maps as the harvest equipment ingests crops in a field during harvesting. However, a primary purpose of harvest equipment is the efficient harvesting of crops from the field. As a result, most harvesters are configured to harvest multiple rows of crops at the same time as the harvest equipment moves through the field. Accordingly, the harvest equipment may only be able approximate the data for a yield map with numerous plants growing, for instance in a ten to fifteen meter area. Additionally, the ingest rate of the harvest equipment may change when the harvest equipment moves up hill, downhill, turns, speeds up, or slows down. The change in ingest rate can lead to difficulties in associating crop yield with a specific area.

SUMMARY

Aspects and advantages of embodiments of the present disclosure will be set forth in part in the following description, or may be learned from the description, or may be learned through practice of the embodiments.

One example aspect of the present disclosure is directed to a method for generating a yield map for a field area. The method can include accessing, by one or more processors, data indicative of a crop yield for a field area. The method can further include accessing, by one or more processors, one or more data types associated with the field area. Each of the data types can provide a geospatial distribution of data associated with vegetation across the field area. The method can further include determining, by the one or more processors, a crop yield distribution for the field area based at least in part on the data indicative of crop yield and the one or more data types and generating, by the one or more processors, a yield map for the field area based at least in part on the crop yield distribution.

Other example aspects of the present disclosure are directed to systems, devices, methods, processes, and non-transitory computer-readable media for generating a yield map for a field area.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussions of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment Thus, it is intended that aspects of the present disclosure cover such modifications and variations.

Example aspects of the present disclosure are directed to systems and methods for generating improved crop yield maps. More particularly, a crop yield distribution for a field area can be determined using data taken from, for instance, harvest equipment. Improved crop yield values can be allocated geospatially across the field area using one or more data types associated with the field area. The data types can include data associated with vegetation that is geospatially distributed across the field area. For instance, the data types can include imagery depicting or otherwise representing vegetation (e.g., vegetation index (VI) imagery, LIDAR imagery, photographic imagery, satellite imagery, aerial imagery, ground based imagery, etc.). The data types can also include data such as stand count data, as-planted values, etc. Once determined, the crop yield distribution can be used to generate an improved crop yield map with increased accuracy and/or resolution relative to yield maps normally generated by harvest equipment.

For example, in one embodiment, data indicative of crop yield for a field area can be accessed (e.g., total crop yield, crop yield distribution generated by harvester equipment, etc.). The crop yield can be more accurately allocated across the field area using one or more VI images. In particular embodiments, a model can analyze pixel value (e.g., pixel color and/or intensity) distribution patterns in one or more VI images and allocate a crop yield value to different geospatial positions in the field area based on the pixel value distribution. As one example, a crop yield value can be determined for discrete subsections of the field area based at least in part on the pixel value for each pixel in the VI image corresponding to the discrete subsections of the field area.

Additional refinements or adjustments to the crop yield distribution generated from the harvester can be determined by adapting the model to account for data from other data sources. For instance, the initial crop yield distribution can be adjusted based on as planted values collected from planting equipment to centralize on probable target crop points on the field. As another example, multiple VI images collected at different times during the growing season can be used to create a more robust model that takes into account growth trends across a growing season. Stand count data can be used to distinguish between target crop and weed locations. LIDAR maps can provide information on crop height to provide additional information relevant to crop vigor in order to refine the accuracy of the model.

Once the crop yield distribution has been determined based on the model, the crop yield distribution can be used to generate an improved crop yield map. The improved crop yield map can similarly include a plurality of pixels. Each pixel includes a pixel value corresponding to the crop yield value determined for the discrete subset of the field area corresponding to the pixel.

In this way, example embodiments of the present disclosure can provide for generation of improved crop yield maps based on crop yield data collected by any harvest equipment. In some embodiments, the improved crop yield maps can be generated to compensate for variations in elevation, slope, soil conditions and harvest equipment variability. As a result, the improved crop yield maps generated according to certain example embodiments of the present disclosure can have a higher degree of accuracy in assessing crop yield distribution. In addition, the improved crop yield maps can lead to more accurate management of the field area, can provide a better understanding of the soil conditions, and can provide a better linkage of crop input application efficacy to specific areas of a field.

As used herein, crop yield can refer to a measure of yield of a crop (e.g., amount of crop harvested) per a unit of area or to a measure of yield of a crop (e.g., amount of crop harvested) for each seed, or other measure of crop yield or to another suitable measure of crop yield. Field area can refer to a space where crops are planted and/or harvested. Data types can include a set of data (e.g., an image, table, or other data set) that provides data points (e.g., pixel values, stand count measurements, etc.) that are geospatially allocated across the field area. A crop yield map can refer to a data set that provides crop yield values that are geospatially allocated over a space. A vegetation index can include any of one or more vegetation indices, including, for instance, a normalized difference vegetation index NDVI, a leaf area index (LAI), a green ratio vegetation index (GRVI), an enhanced vegetation index (EVI), a difference vegetation index (DVI), a simple ratio index (SR), or other index. The term "about" when used in conjunction with a numerical value refers to within 35% of the stated numerical value.

Figure 1:
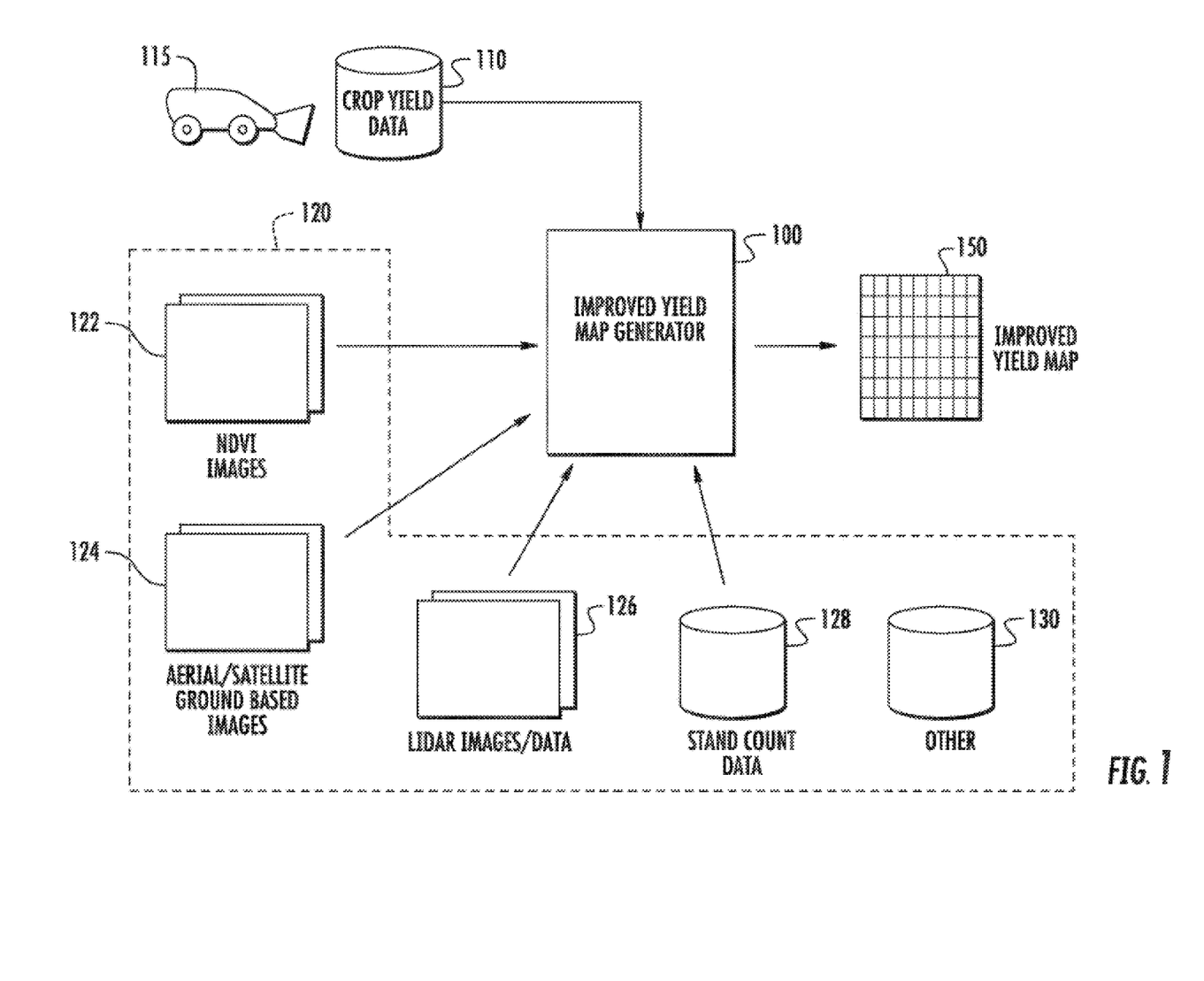
FIG. 1 depicts an overview of improved crop yield mapping according to example embodiments of the present disclosure.

FIG. 1 depicts an overview of generation of an example improved crop yield map according to example embodiments of the present disclosure. More particularly, an improved yield map generator 100 can be implemented by one or more processors to generate an improved crop yield map 150 based on various data sources, such as data indicative of crop yield 110 (e.g. yield maps generated from the harvest equipment 115) for a field area and one or more data types 120. Referring to FIG. 1, the improved crop yield map 150 can be analyzed to determine best field management practices for various growing inputs (e.g., moisture, pesticide, stand count, etc.) to obtain improved crop yield for the field area.

Figure 5:
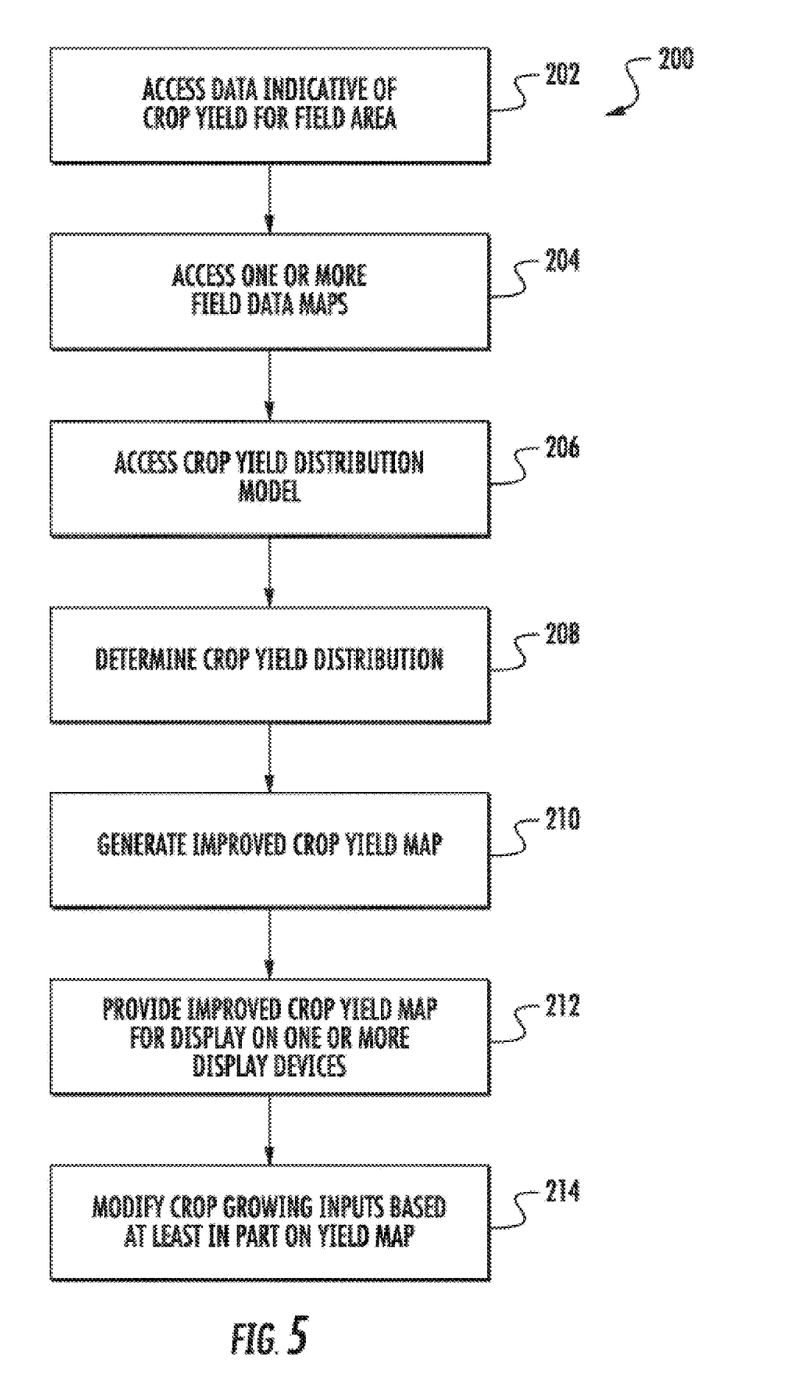
FIG. 5 depicts a flow diagram of an example method according to example embodiments of the present disclosure.

In some embodiments, the improved yield map generator 100 can include computer logic used to generate a crop yield map according to example aspects of the present disclosure. The improved yield map generator 100 can be implemented in hardware, application specific circuits, firmware and/or software controlling a general purpose processor. In one embodiment, the improved yield map generator 100 can include program code files stored on one or more memory devices and executed by one or more processors or can be provided from computer program products, for example computer executable instructions, that are stored in a tangible computer-readable storage medium such as RAM, ROM, hard disk or optical or magnetic media. When software is used, any suitable programming language or platform can be used to implement the improved yield map generator 100. A flow diagram of an example method implemented by an improved yield map generator 100 is depicted in FIG. 5.

The improved yield map generator 100 can access data indicative of crop yield for the field area. The crop yield data 110 obtained from the harvest equipment 115 can be the total volume of crops ingested by harvest equipment from the field area, a crop yield distribution generated by the harvest equipment 115, or any other crop yield data obtained from the harvest equipment 115 or other source. For instance, harvest equipment 115 can ingest crops from the field area. Crop yield data 110 for the field area can be determined, for instance, by the harvest equipment 115 or other equipment. The crop yield data 110 can be stored in one or more memory devices for access by the improved yield map generator 100.

Figure 2:
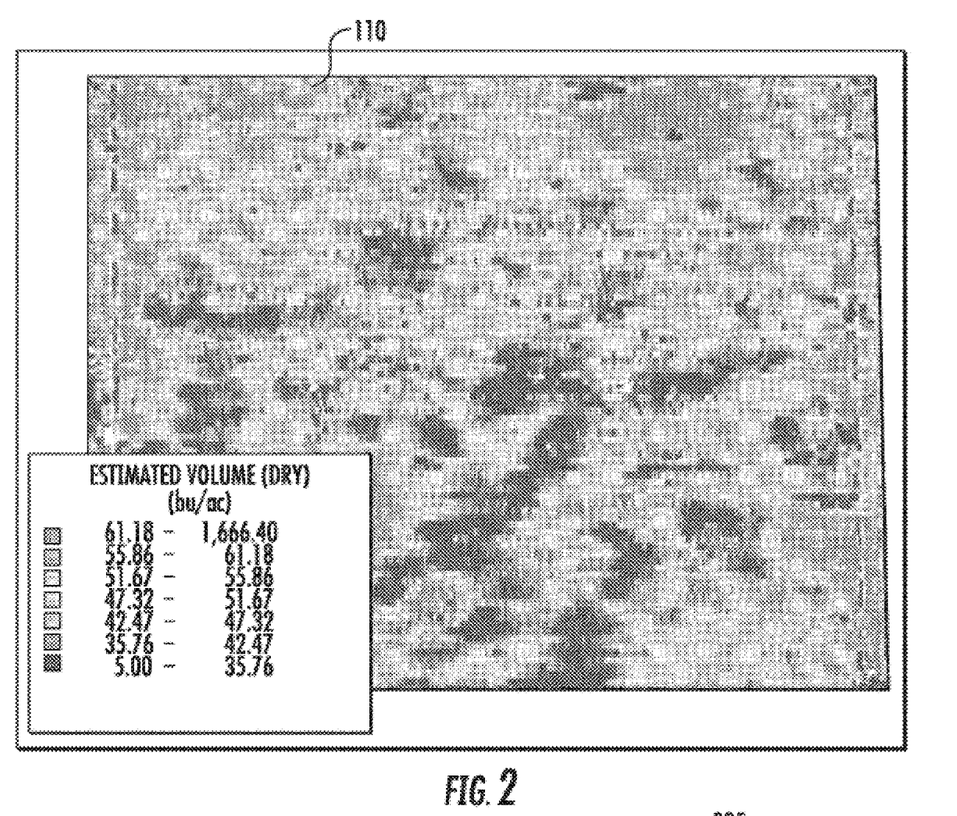
FIG. 2 depicts an example crop yield map generated by harvest equipment.

FIG. 2 depicts one example of crop yield data 110 that can be generated by the harvest equipment 115. Crop yield data 110 can be a crop yield map that includes a plurality of pixels. Each pixel represents a discrete subsection of the crop yield map. In addition, each pixel corresponds to a discrete subsection of the field area represented by the crop yield map. Each pixel can have a pixel value associated with the color and/or intensity of the pixel. The pixel value of a pixel can be indicative of the crop yield value for the discrete subsection of the field area represented by the pixel.

Referring back to FIG. 1, the improved yield map generator 100 can also access data associated with one or more data types 120. The data types 120 can include data collected during the growing season that is geospatially allocated across the field area. As will be discussed in more detail below, the data types 120 can be used by the improved crop yield map generator 100 to more accurately geospatially allocate data indicative of crop yield across the field area.

The one or more data types 120 can include, for instance, one or more VI images 122 associated with the field area. Each of the one or more VI images 122 can include a plurality of pixels. Each pixel can have a pixel value (e.g., color and/or intensity) associated with the amount of vegetation in a discrete subsection of the field area corresponding to the pixel. More particularly, each pixel in the VI images can correspond to a discrete subsection of the field area (e.g., depicts the discrete subsection of the field area). The pixel value associated with the pixel is indicative of the amount of live vegetation in the discrete subsection.

The VI images 122 can be accessed or obtained from any suitable source. For instance, in some embodiments, the VI images 122 can be VI images captured, for instance, from a satellite based on spectral reflectance measurements. In some embodiments, the VI images 122 can be captured at different times during the growing season. For instance, a first VI image can be captured at a first time during the growing season A second VI image can be captured at a second time that is different from the first time during the growing season.

The one or more data types 120 can include photographic imagery 124, such as aerial imagery, satellite imagery, or ground based imagery captured of the field area, for instance, from an image capture device. Aerial imagery can include images (e.g. photos) captured of the field area from an aerial perspective, for instance, from manned or unmanned aerial aircraft. Satellite imagery can include images (e.g. photos) of the field area captured from one or more satellites. Ground-based images can be images captured of the field area from a perspective at or near ground level. The photographic imagery 124 can include digital images captured of the field area. The photographic imagery 124 can depict vegetation at various stages of the growing season to assist with geospatial allocation of crop yield across the field area by the improved yield map generator 100.

The one or more data types 120 can include LIDAR data 126 (e.g., LIDAR images) associated with the field area. The LIDAR data 126 can provide depth information associated with different geospatial points in the field area based on laser range sensing measurements. The depth information can be indicative of crop height, which can provide a measure of crop vigor and other crop health. The LIDAR data 126 can be used to determine a geospatial allocation of crop yield across the field area by the improved yield map generator 100 by providing a metric indicative of crop growth height.

The one or more data types 120 can include stand count data 128. Stand count data 128 can provide a measure of the number of plants that emerge from seeds in a given area. The stand count data 128 can provide stand count values for different geospatial areas of the field area. The stand count data 128 can be used to determine a geospatial allocation of crop yield across the field area by the improved yield map generator 100 based on actual number of plants that grow from planted seeds.

The one or more data types 120 can include other data 130 associated with vegetation that is geospatially allocated across the field area. As one example, the one or more data types 120 can include as-planted data indicative of the number of crop planted in discrete geospatial subsections of the field area. The as-planted data can be obtained from, for instance, planting equipment. As another example, the one or more data types 120 can include hyperspectral imagery captured of the field area. Other data further includes, but is not limited to, other agronomic field observations (e.g. disease ratings, arthropod damage ratings, etc.), physical properties of the field (e.g. soil data such as moisture data, electrical conductivity, soil type, soil chemistry, ground elevation, etc.), and climatological elements (e.g., weather station data, forecasting data, etc.).

The improved yield map generator 100 can be configured to process the crop yield data 110 and the one or more data types 120 to generate the improved crop yield map 150 for the field area. More particularly, the improved yield map generator 100 can generate a crop yield distribution that provides more accurate crop yield values for discrete subsections of the field area. The crop yield distribution can be used to generate the improved crop yield map 150. The improved crop yield map 150 can be stored in one or more memory devices and/or provided for display on one or more display devices to provide graphical representation of the crop yield distribution.

Figure 3:
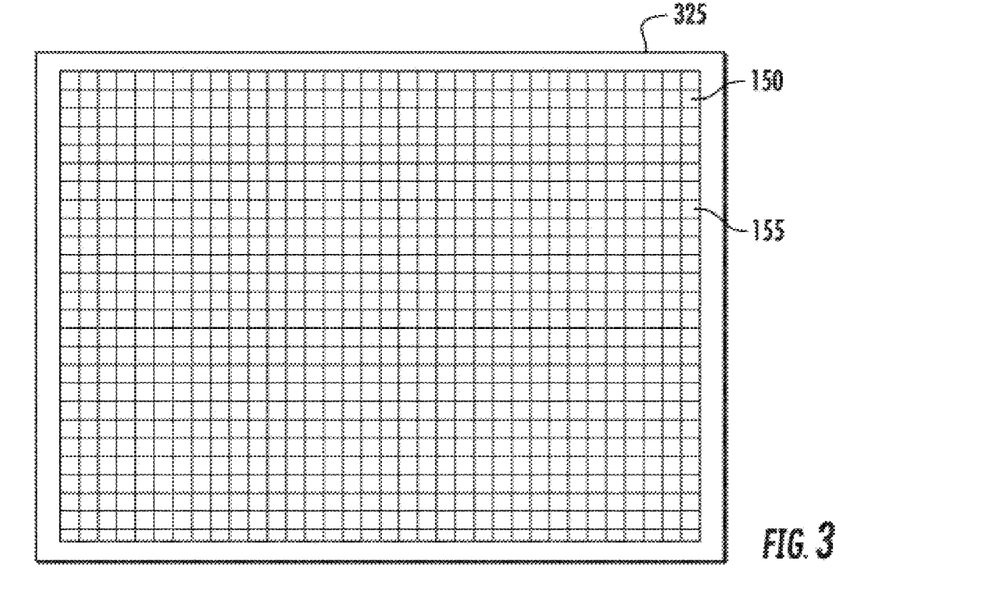
FIG. 3 depicts a representation of an improved crop yield map according to example embodiments of the present disclosure.

FIG. 3 depicts an example improved crop yield map 150 generated according to example embodiments of the present disclosure. The improved crop yield map 150 is illustrated as displayed on a display device 325. The display device 325 can be a display associated with a computing device, such as a desktop, laptop, tablet, mobile phone, wearable device, display with one or more processors, special purpose computing device, or other device.

The improved crop yield map 150 includes a plurality of pixels 155. Each pixel 155 represents a discrete subsection of the improved crop yield map 150. In addition, each pixel 155 corresponds to a discrete subsection of the field area represented by the crop yield map. Each pixel 155 can have a pixel value associated with the color and/or intensity of the pixel. The pixel value of a pixel can be indicative of the crop yield value for the discrete subsection of the field area represented by the pixel.

Referring to FIG. 1, the yield map generator 100 can be configured to generate the improved crop yield map 150 using a model defining crop yield values for discrete subsections of the field area as a function of the crop yield and data associated with the discrete subsections from the one or more data types. The model can be an algorithm (e.g., a non-linear algorithm), statistical model, lookup table, correlation, function, or other suitable relationship.

For example, in one embodiment, the improved yield map generator 100 can be configured to allocate crop yield geospatially across the field area based on the pixel values of a VI image 122 collected of the field area when the crops are in a peak vegetative state. More particularly, the model can correlate the pixel values of pixels in the VI image 122 with a crop yield values for the discrete subsections of the field area corresponding to the pixels to determine a crop yield distribution for the field area.

Figure 4:
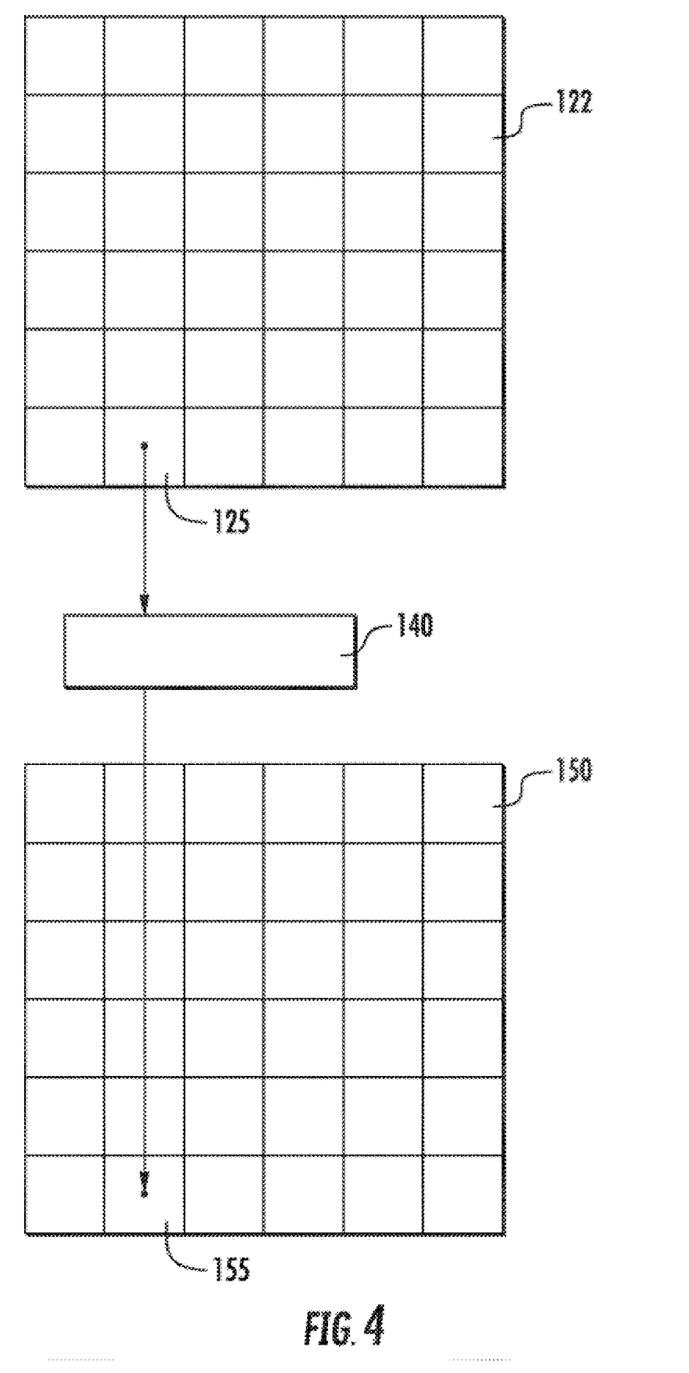
FIG. 4 depicts the example determination of a crop yield distribution from a VI image according to example embodiments of the present disclosure.

For instance, FIG. 4 depicts an example VI image 122. The VI image 120 has a plurality of pixels 125. Each pixel 125 corresponds to a discrete subsection of the field area. Each pixel 125 has a pixel value indicative of the amount of vegetation in the discrete subsection.

The pixel value of pixel 125 can be provided to a model 140. The model 140 can correlate the pixel value of the VI image as well as yield data generated by harvest equipment with a crop yield value for the discrete subsection corresponding to the pixel 125. A pixel value for pixel 155 of the crop yield map 150 corresponding to the discrete subsection can be determined based at least in part on the crop yield value.

In some embodiments, the model 140 can determine the crop yield value for the discrete subsection based on other data types such as photographic imagery 124, LIDAR data 126, stand count data 128, and other data types 130. For example in some embodiments, an initial crop yield value can be determined based at least in part on crop yield data from the harvest equipment. The initial crop yield value can be adjusted and or refined based on the other data types (e.g., VI images) as the other data sources become available. Depending on the availability of other data types, the initial crop yield value can be adjusted based on stand count data to differentiate between target crops and weeds, LIDAR data to account for crop height, VI imagery collected at different times to account for different stages of growth, etc.

Example aspects of the present disclosure are discussed with reference to adjusting an initial crop yield value generated by harvest equipment based on a VI image 122 for purposes of illustration and discussion. Those of ordinary skill in the art, using the disclosures provided herein, will understand that the initial crop yield value can be determined based on other data sources, such as photographic imagery, LIDAR imagery, hyperspectral imagery, stand count data, etc.

In some embodiments, the model 140 can be configured to determine the crop yield distribution as a function of multiple inputs. Each input can be allocated a weight in the model. More particularly, the model can have weights associated with each of the one or more data types or other data sources that are used determining the crop yield distribution for the field area. Higher weights can be provided to certain data types (e.g., VI images) relative to the other data types (e.g. photographic imagery). A model based on multiple inputs can provide a more robust and accurate determination of crop yield distribution based on numerous factors.

FIG. 5 depicts a flow diagram of an example method (200) of generating an improved crop yield map according to example embodiments of the present disclosure. The method (200) can be implemented by one or more processors, such as one or more processors implanting an improved crop yield generator 100 according to example aspects of the present disclosure. In addition, FIG. 5 depicts steps performed in a particular order for purposes of illustration and discussion. Those of ordinary skill in the art, using the disclosures provided herein, will understand that various steps of any of the methods disclosed here can be adapted, modified, rearranged or omitted in various ways without deviating from the scope of the present disclosure.

At (202), the method includes accessing crop yield data for a field area generated by, for instance, harvest equipment or other source. The data indicative of crop yield can be based at least in part on, for instance, total crop ingested from the field area by harvest equipment during harvest, crop yield distribution generated by the harvest equipment, etc. The crop yield data from the harvest equipment can be accessed from a memory device or can be input by a user via a suitable user interface and/or input device.

At (204), one or more data types can be accessed. The one or more data types can organize data associated with vegetation such that it is geospatially distributed across the field area. Example data types can include VI images, hyperspectral images, photographic images (e.g., aerial, satellite, ground-based), LIDAR data, stand count data, as-planted data, other agronomic field observations (e.g. disease ratings, arthropod damage ratings, etc.), physical properties of the field (e.g. SSURGO soil data (SSURGO: (Soil Survey Geographic database), elevation, etc.), climatological elements (e.g., weather station data, forecasting data, etc.).

At (206), the method can include accessing a crop yield distribution model. The model can define crop yield values for discrete subsections of the field area as a function of the data indicative of crop yield and the one or more data types. For instance, the geospatial allocation of data in the data types can be used to inform the crop yield distribution of the crop yield data generated by the harvest equipment across the field area. The model can be an algorithm (e.g., a non-linear algorithm), statistical model, lookup table, correlation, function, or other suitable relationship.

For instance, as discussed above, the model can correlate crop yield distribution as a function of multiple inputs. Each input can be allocated a weight in the model. More particularly, the model can have weights associated with each of the one or more data types or other data sources that are used determining the crop yield distribution for the field area. Higher weights can be provided to certain data types (e.g., VI images) relative to the other data types (e.g. photographic imagery). A model based on multiple inputs can provide a more robust and accurate determination of crop yield distribution based on numerous factors.

At (208), a crop yield distribution for the field area can be determined using the model. For instance, crop yield values for discrete subsections of the field area can be determined based at least in part on the model. As one example, a crop yield value for a discrete geospatial area can be determined based on a data point (e.g., pixel value, depth data, stand count data) for the discrete geospatial area.

Once the crop yield distribution has been determined, an improved crop yield map can be generated (210). The improved crop yield map can include a plurality of pixels. Each of the plurality of pixels can have a pixel value corresponding to the crop yield value for the discrete subsection of the field area corresponding to the pixel.

At (212), the improved crop yield map can be provided for display on one or more display devices. A user can analyze the improved crop yield map to assess various conditions of the field area and growing inputs for their effect on crop yield. In some embodiments, crop growing inputs (e.g., amount of watering, application of fungicides, etc.) can be modified to provide for improved crop yield based at least in part on the yield map as shown at (214).

Figure 6:
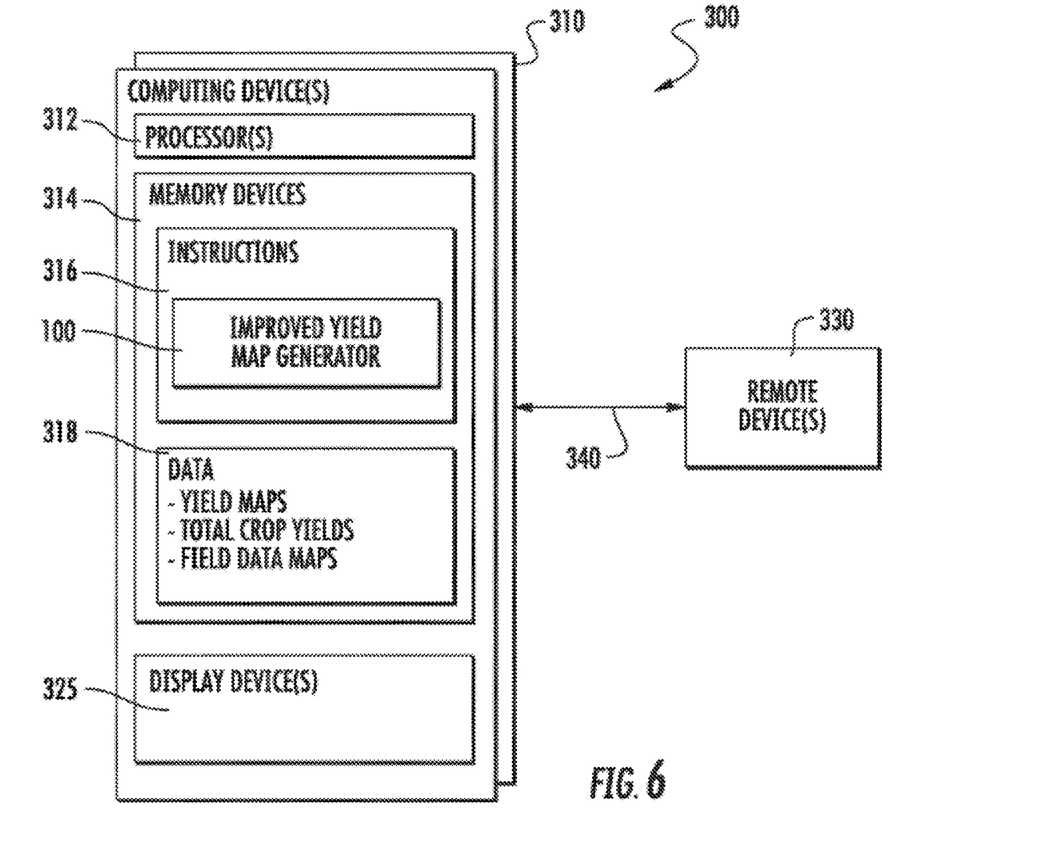
FIG. 6 depicts an example system for generating a crop yield map according to example embodiments of the present disclosure.

FIG. 6 depicts an example computing system 300 that can be used to implement the methods and systems according to example aspects of the present disclosure. The system 300 can include one or more computing devices 310. The computing device(s) 310 can have one or more processors 312 and one or more memory devices 314. The computing device(s) 310 also include a network interface used to communicate with one or more remote devices 330 over a communication link 340. The network interface can include any suitable components for interfacing with one more networks, including for example, transmitters, receivers, ports, controllers, antennas, or other suitable components.

The one or more processors 312 can include one or more suitable processing devices, such as a microprocessor, microcontroller, integrated circuit, logic device, or other suitable processing device. The memory devices 314 can include one or more computer-readable media, including, but not limited to, non-transitory computer-readable media, RAM, ROM, hard drives, flash drives, or other memory devices. The memory devices 314 can store information accessible by the one or more processors 312, including computer-readable instructions 316 that can be executed by the one or more processors 312. The instructions 316 can be any set of instructions that when executed by the one or more processors 312 cause the one or more processors 312 to perform operations. The instructions 316 can be implemented in hardware and/or software. In some embodiments, the instructions 316 can be executed by the one or more processors 312 to implement the yield map generator 100 and/or the method of FIG. 5 according to example embodiments of the present disclosure.

Referring to FIG. 6, memory devices 314 can also include data 318 that can be retrieved, manipulated, created, or stored by the one or more processors 312. The data 318 can include, for instance, yield maps, data types, crop yield data from the harvest equipment, and other data. The data 318 can be stored in one or more databases. The one or more databases can be connected to the computing device(s) 310 by a high bandwidth LAN or WAN, or can also be connected to computing device(s) 310 through communication link (network) 340. The one or more databases can be split up so that they are located in multiple locales.

The computing device(s) 310 can exchange data with one or more remote devices 330 over the communication link 340. Similar to the computing device(s) 310, the remote device(s) 330 can include one or more processors and memory devices. The communication link 340 can include any combination of wired and or wireless communication links. In some embodiments, the communication link 340 can include any type of communications network, such as a local area network (e.g. intranet), wide area network (e.g. Internet), cellular network, or some combination thereof. The communication link 340 can also include a direct connection between the computing device(s) 310 and the remote device(s) 330.

The computing device(s) 310 can include various input output devices for providing and receiving information from a user, such as a touch screen, touch pad, data entry keys, speakers, and/or a microphone suitable for voice recognition. For instance, the computing device(s) 310 can have a display device 330 for presenting a crop yield map to a user.

Further examples of the present invention are:

An apparatus according to one or more aspects of any embodiments disclosed herein, or variants thereof.

A system according to one or more aspects of any of the embodiments disclosed herein, or variants thereof.

A method according to one or more aspects of any of the embodiments disclosed herein, or variants thereof.

A method for generating a yield map for a field area, comprising: accessing, by one or more processors, data indicative of crop yield for a field area; accessing, by the one or more processors, one or more data types associated with the field area, each of the data types providing a geospatial distribution of data associated with vegetation across the field area; determining, by the one or more processors, a crop yield distribution for the field area based at least in part on the data indicative of crop yield and the one or more data types; and generating, by the one or more processors, a yield map for the field area based at least in part on the crop yield distribution.

The method as defined above, wherein the method further comprises providing the yield map for display on one or more display devices.

The method as defined in above, wherein determining, by the one or more processors, a crop yield distribution for the field area comprises: accessing, by the one or more processors, a model defining crop yield values for discrete subsections of the field area as a function of at least the one or more data types; and determining, by the one or more processors, the crop yield distribution based at least in part on the model.

The method as defined above, wherein the yield map comprises a plurality of pixels, the pixel value of each pixel being determined based at least in part on a crop yield value for the discrete subsections of the field area corresponding to the pixel.

The method as defined above, wherein the one or more data types comprise a vegetation index (VI) image of the field area.

The method as defined above, wherein determining, by the one or more processors, a crop yield distribution for the field area comprises determining, by the one or more processors, a crop yield value for discrete subsections of the field area based at least in part on a pixel value of a pixel corresponding to the discrete subsections in the VI image.

The method as defined above, wherein the one or more data types comprise a plurality of VI images, each of the VI images captured at a different time.

The method as defined above, wherein the one or more data types comprise stand count data for the field area.

The method as defined above, wherein the one or more data types comprise one or more LIDAR images for the field area.

The method as defined above, wherein the one or more data types comprise one or more satellite images, aerial images, or ground based images of the field area.

The method as defined above, wherein the one or more data types comprise as-planted values obtained from planting equipment.

The method as defined above, wherein the one or more data types comprise one or more hyperspectral images obtained of the field area.

The method as defined above, wherein the data indicative of crop yield is generated by harvesting equipment for the field area.

A method for generating a yield map for a field area, comprising: accessing, by one or more processors, data indicative of crop yield for a field area; accessing, by the one or more processors, a vegetation index (VI) image of the field area, the VI image comprising a plurality of pixels, each pixel in the VI image having a pixel value associated with an amount of vegetation in a discrete subsections of the field area corresponding to the pixel; determining, by the one or more processors, a crop yield distribution for the field area, the crop yield distribution comprising a crop yield value for each of a plurality of discrete subsections of the field area determined based at least in part on the data indicative of crop yield and the pixel value of the pixel in the VI image corresponding to the discrete subsections in the field area; and generating, by the one or more processors, a yield map for the area based at least in part on the crop yield distribution, the yield map comprising a plurality of pixels, the pixel value of each pixel in the yield map being determined based at least in part on a crop yield value for the discrete subsections of the field area corresponding to the pixel.

The method as defined above, wherein the method further comprises: refining, by the one or more processors, the crop yield distribution based at least in part on one or more data types.

The method as defined above, wherein the one or more data types comprise one or more VI images captured at different time periods, one or more LIDAR images, one or more satellite images, aerial images, or ground based images of the field area, stand count data, as planted values obtained from planting equipment, or one or more hyperspectral images.

A system comprising: one or more display devices; one or more processors; and one or more memory devices, the one or more memory devices storing computer-readable instruction that when executed by the one or more processors cause the one or more processors to perform operations, the operations comprising one or more aspects of any of the methods above.

One or more tangible, non-transitory computer-readable media storing computer-readable instructions that when executed by one or more processors cause the one or more processors to perform operations, the operations comprising one or more aspects of any of the methods of the preceding claims.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for generating a yield map for a field area, the system comprising:
    a memory device;
    a processing device operatively coupled to the memory device, wherein the processing device is configured to:
        access data indicative of crop yield for a field area;
        access one or more data types associated with the field area, each of the data types providing a geospatial distribution of data associated with vegetation across the field area;
        determine a crop yield distribution for the field area, the crop yield distribution comprising a crop yield value for each of a plurality of discrete subsections of the field area determined based at least partially on the data indicative of crop yield and at least one pixel value of pixels in an image corresponding to the discrete subsections in the field area; and
        generate a yield map for the field area based at least partially on the crop yield distribution, the yield map comprising a plurality of pixels, wherein pixel values of each pixel in the yield map are to be determined based at least partially on a crop yield value for the discrete subsections of the field area corresponding to the pixel.

2. The system of claim 1, wherein the one or more data types comprise one or more vegetation index (VI) images captured at different time periods, one or more LIDAR images, one or more satellite images, aerial images, or ground based images of the field area, stand count data, as-planted values obtained from planting equipment, or one or more hyperspectral images.

3. The system of claim 1, wherein the image corresponding to the discrete subsections in the field area comprises a VI image of the field area.

4. The system of claim 1, wherein the processing device is further configures to:
    determine the crop yield distribution based at least partially on the one or more data types.

5. The system of claim 4, wherein to determine the crop yield distribution, the processing device is configured to:
    access a model defining crop yield values for discrete subsections of the field area as a function of at least the one or more data types.

6. The system of claim 5, wherein the processing device is configured to determine the crop yield distribution based at least partially on the model.

7. The system of claim 1, further comprising:
    a display device operatively coupled to the processing device, wherein the processing device is configured to cause the display device to display a representation of the yield map.

8. A method of generating a yield map for a field area, the method comprising:
    accessing, by a processing device, data indicative of crop yield for a field area;
    accessing, by the processing device, one or more data types associated with the field area, each of the data types providing a geospatial distribution of data associated with vegetation across the field area;
    determining, by the processing device, a crop yield distribution for the field area, the crop yield distribution comprising a crop yield value for each of a plurality of discrete subsections of the field area determined based at least partially on the data indicative of crop yield and at least one pixel value of pixels in an image corresponding to the discrete subsections in the field area; and
    generating, by the processing device, a yield map for the field area based at least partially on the crop yield distribution, the yield map comprising a plurality of pixels, wherein pixel values of each pixel in the yield map are determined based at least partially on a crop yield value for the discrete subsections of the field area corresponding to the pixel.

9. The method of claim 8, wherein the one or more data types comprise one or more vegetation index (VI) images captured at different time periods, one or more LIDAR images, one or more satellite images, aerial images, or ground based images of the field area, stand count data, as-planted values obtained from planting equipment, or one or more hyperspectral images.

10. The method of claim 8, wherein the image corresponding to the discrete subsections in the field area comprises a VI image of the field area.

11. The method of claim 8, further comprising:
    determining, by the processing device, the crop yield distribution based at least partially on the one or more data types.

12. The method of claim 11, wherein determining the crop yield distribution further comprises:
    accessing, by the processing device, a model defining crop yield values for discrete subsections of the field area as a function of at least the one or more data types.

13. The method of claim 12, wherein determining the crop yield distribution further comprises:
    determining, by the processing device, the crop yield distribution based at least partially on the model.

14. The method of claim 8, further comprising:
causing, by the processing device, a display device to display a representation of the yield map.

15. A non-transitory computer-readable medium having instructions stored thereon that, when executed by a processing device, cause the processing device to:
access data indicative of crop yield for a field area;
access one or more data types associated with the field area, each of the data types providing a geospatial distribution of data associated with vegetation across the field area;
determine a crop yield distribution for the field area, the crop yield distribution comprising a crop yield value for each of a plurality of discrete subsections of the field area determined based at least partially on the data indicative of crop yield and at least one pixel value of pixels in an image corresponding to the discrete subsections in the field area; and
generate a yield map for the field area based at least partially on the crop yield distribution, the yield map comprising a plurality of pixels, wherein pixel values of each pixel in the yield map are to be determined based at least partially on a crop yield value for the discrete subsections of the field area corresponding to the pixel.

16. The non-transitory computer-readable medium of claim 15, wherein the one or more data types comprise one or more vegetation index (VI) images captured at different time periods, one or more LIDAR images, one or more satellite images, aerial images, or ground based images of the field area, stand count data, as-planted values obtained from planting equipment, or one or more hyperspectral images.

17. The non-transitory computer-readable medium of claim 15, wherein the image corresponding to the discrete subsections in the field area comprises a VI image of the field area.

18. The non-transitory computer-readable medium of claim 15, wherein the instructions further cause the processing device to:
determine the crop yield distribution based at least partially on the one or more data types.

19. The non-transitory computer-readable medium of claim 18, wherein to determine the crop yield distribution, the instructions further cause the processing device to:
access a model defining crop yield values for discrete subsections of the field area as a function of at least the one or more data types; and
determine the crop yield distribution based at least partially on the model.

20. The non-transitory computer-readable medium of claim 15, wherein the instructions further cause the processing device to:
cause a display device to display a representation of the yield map.

* * * * *